United States Patent
Bin et al.

(10) Patent No.: US 9,742,911 B2
(45) Date of Patent: Aug. 22, 2017

(54) DIALING METHOD AND DEVICE

(71) Applicant: INTERNATIONAL BUSINESS MACHINES CORPORATION, Armonk, NY (US)

(72) Inventors: Dai Bin, Beijing (CN); Yang Lei, Beijing (CN); Chen Y. Yu, Beijing (CN); Xin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/837,506

(22) Filed: Aug. 27, 2015

(65) Prior Publication Data
US 2016/0065734 A1    Mar. 3, 2016

(30) Foreign Application Priority Data
Aug. 29, 2014    (CN) .......................... 2014 1 0437804

(51) Int. Cl.
*H04M 3/42* (2006.01)
*H04M 3/46* (2006.01)
*H04W 4/16* (2009.01)

(52) U.S. Cl.
CPC ....... *H04M 3/465* (2013.01); *H04M 3/42153* (2013.01); *H04W 4/16* (2013.01); *H04M 2203/15* (2013.01)

(58) Field of Classification Search
CPC ................................................... H04M 3/465
USPC ..................................................... 455/414.1
See application file for complete search history.

(56) References Cited

U.S. PATENT DOCUMENTS

| | | | |
|---|---|---|---|
| 6,484,037 | B1 * | 11/2002 | Schmidt .................. H04M 3/56 455/514 |
| 7,702,349 | B2 | 4/2010 | Harris et al. |
| 8,498,660 | B2 | 7/2013 | Lawler et al. |
| 8,666,052 | B2 | 3/2014 | Parandekar et al. |

(Continued)

OTHER PUBLICATIONS

Impact Technologies, Inc. "Personal & Group Calling Services," http://www.impacttech.com/index.php?=37, downloaded from internet Jul. 8, 2014, pp. 1-2.

(Continued)

*Primary Examiner* — Sam K Ahn
*Assistant Examiner* — Fabricio R Murillo Garcia
(74) *Attorney, Agent, or Firm* — David Zwick; Matthew M. Hulihan; Heslin Rothenberg Farley & Mesiti PC

(57) ABSTRACT

A dialing method for a calling party includes determining a plurality of phone number groups to be dialed in a simultaneous or sequential ringing mode, each of the groups including at least one phone number; and transmitting the plurality of phone number groups and a dialing flag to a calling server. The dialing flag including a simultaneous or sequential ringing flag indicating that the plurality of phone number groups are to be dialed in the simultaneous or sequential ringing mode. The calling party can freely custom multiple phone numbers expected to be rung simultaneously or sequentially and transmit them to a calling server, without registering in the calling server in advance. Thus, the trouble of the user registering the numbers in the calling server may be avoided and the calling server does not need to maintain a large-scale database for storing the multiple numbers at a large cost.

20 Claims, 3 Drawing Sheets

(56) References Cited

U.S. PATENT DOCUMENTS

| | | | |
|---|---|---|---|
| 2007/0147600 A1* | 6/2007 | Stahlman | H04M 3/46 |
| | | | 379/266.07 |
| 2008/0031436 A1* | 2/2008 | Der | H04M 3/46 |
| | | | 379/201.02 |
| 2008/0317227 A1* | 12/2008 | Croak | H04M 3/46 |
| | | | 379/201.01 |
| 2010/0128857 A1* | 5/2010 | Logan | H04M 3/42229 |
| | | | 379/88.22 |
| 2012/0224513 A1 | 9/2012 | Mahler et al. | |
| 2013/0070912 A1* | 3/2013 | Parandekar | H04M 3/465 |
| | | | 379/88.05 |
| 2013/0156169 A1* | 6/2013 | Alberth | H04M 3/465 |
| | | | 379/88.16 |

OTHER PUBLICATIONS

Freedom Voice, "How do I set up group forwarding or special kings of calling like simultaneous, rotation etc.?", https://getsatisfaction.com/freedomvoice/topics/how_do_i_set_up_group_forwarding_or_special_kinds_of_calling_like_simultaneous_rotation_etc, downloaded from internet Jul. 8, 2014, pp. 1-6.
Ring Central, "Customizing the Call Handling & Forwarding Feature Under User Hours," http://success.ringcentral.com/articles/RC_Knowledge_Article/5-10-Editing-your-Extention-s-Business_Hours_Rules_via_Web, downloaded from internet Jul. 7, 2014, pp. 1-8.

* cited by examiner

DIALING METHOD AND DEVICE

PRIOR FOREIGN APPLICATION

This application claims priority from Chinese (CN) patent application number 201410437804.8, filed Aug. 29, 2014, which is hereby incorporated herein by reference in its entirety.

BACKGROUND

One or more aspects relate to telephone communication, and more specifically, to a dialing method and device.

In current telephone communication, simultaneous ringing and sequential ringing services for a plurality of dialed numbers are provided. The simultaneous ringing refers to that a calling server dials a plurality of predetermined phone numbers simultaneously, and if any one of these numbers gets through, the dialing for other numbers is stopped. The sequential ringing refers to that the calling server dials a first one of a plurality of predetermined phone numbers at first, and if the first number does not answer in a predetermined time, a next one of the plurality of predetermined phone numbers is dialed in a predetermined order, and so on, and if a certain number gets through, the sequent phone numbers are usually not dialed.

FIG. 2 schematically shows an architectural diagram of an example implementation for the simultaneous and sequential ringing in the prior art. As shown in FIG. 2, a plurality of phone numbers expected to be dialed in a simultaneous/sequential ringing mode are set by the called party in advance, and the calling server registers the plurality of phone numbers and assigns a unified phone number to them. When the calling party dials this unified phone number, the calling server dials the plurality of phone numbers corresponding to this unified phone number in the simultaneous/sequential ringing mode. It can be seen that in the current simultaneous/sequential ringing service, since the plurality of predetermined phone numbers are required to be registered in the calling server, the calling server needs to maintain a large-scale database for storing the phone numbers at a large cost. Also, when any one of the plurality of phone numbers expected to be dialed in the simultaneous/sequential ringing mode changes, the called party needs to re-register it in the calling server, which is troublesome for the user.

SUMMARY

In one aspect, a dialing technique is provided which enables the calling party to freely custom the plurality of phone numbers which are desired to be rung simultaneously/sequentially without registering them in the calling server in advance, so that there is no need to maintain the large-scale database for storing the plurality of phone numbers at a large cost.

According to one aspect, a dialing method is provided. The dialing method includes determining a plurality of phone number groups to be dialed in at least one of a simultaneous ringing mode or a sequential ringing mode, each phone number group of the plurality of phone number groups including at least one phone number; and transmitting, by a device, the plurality of phone number groups and a dialing flag to a calling server, the dialing flag including at least one of a simultaneous ringing flag or a sequential ringing flag indicating that the plurality of phone number groups are to be dialed in at least one of the simultaneous ringing mode or the sequential ringing mode.

In accordance with another aspect, a computer system is provided. The computer system includes a memory; and a processing device in communication with the memory, wherein the computer system is configured to perform a method. The method includes determining a plurality of phone number groups to be dialed in at least one of a simultaneous ringing mode or a sequential ringing mode, each phone number group of the plurality of phone number groups including at least one phone number; and transmitting the plurality of phone number groups and a dialing flag to a calling server, the dialing flag including at least one of a simultaneous ringing flag or a sequential ringing flag indicating that the plurality of phone number groups are to be dialed in at least one of the simultaneous ringing mode or the sequential ringing mode.

According to yet a further aspect, a computer program product is provided. The computer program product includes a computer readable storage medium readable by a processing circuit and storing instructions for execution by the processing circuit for performing a method. The method includes determining a plurality of phone number groups to be dialed in at least one of a simultaneous ringing mode or a sequential ringing mode, each phone number group of the plurality of phone number groups including at least one phone number; and transmitting, by a device, the plurality of phone number groups and a dialing flag to a calling server, the dialing flag including at least one of a simultaneous ringing flag or a sequential ringing flag indicating that the plurality of phone number groups are to be dialed in at least one of the simultaneous ringing mode or the sequential ringing mode.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

One or more embodiments are described in more detail with reference to the accompanying drawings, in which embodiments of the present disclosure have been illustrated. However, aspects of the present disclosure can be implemented in various manners, and thus should not be construed to be limited to the embodiments disclosed herein. On the contrary, those embodiments are provided for a thorough and complete understanding of the present disclosure, and completely conveying the scope of aspects of the present disclosure to those skilled in the art.

Figure 1:
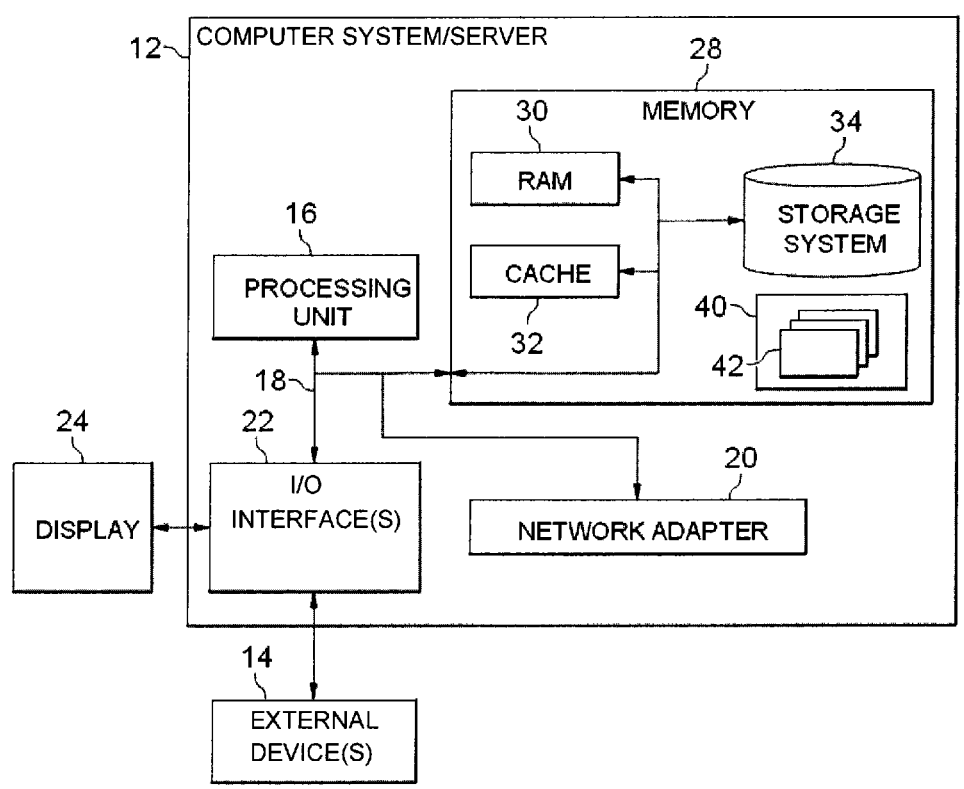
FIG. 1 shows an exemplary computer system/server 12 which is applicable to implement one or more embodiments of the present disclosure.
Figure 2:
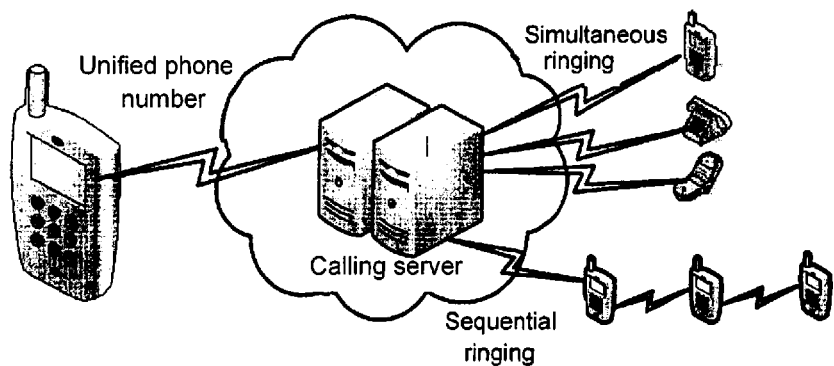
FIG. 2 schematically shows an architectural diagram of an example implementation for the simultaneous and sequential ringing in the prior art.

Referring now to FIG. 1, in which an example computer system/server 12 which is applicable to implement embodiments of the present disclosure is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
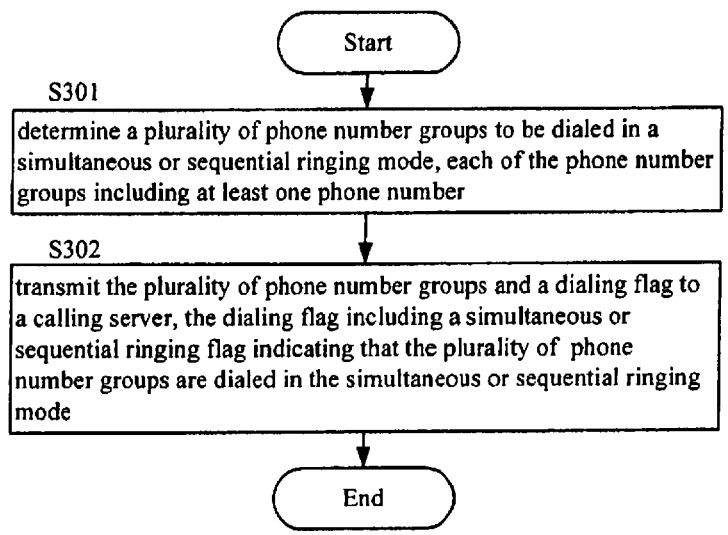
FIG. 3 illustrates a flow chart of a dialing method which is applied to the calling party according to an embodiment of the present disclosure.

With reference now to FIG. 3, it shows a flow chart of a dialing method which is applied to the calling party according to an embodiment of the present disclosure.

As shown in FIG. 3, at step S301, a plurality of groups of phone numbers to be dialed in a simultaneous or sequential ringing mode are determined, each of the phone number groups including at least one phone number.

In this step, the plurality of phone number groups to be dialed in a simultaneous or sequential ringing mode can be determined based on groups of simultaneous ringing numbers and/or groups of sequential ringing numbers defined by a user of the calling party.

For example, assuming that the calling user defines a simultaneous ringing number group including five phone numbers A, B, C, D and E, then it can be determined that there are five phone number groups to be dialed in the simultaneous ringing mode, wherein each of the phone number groups includes one of the numbers A, B, C, D and E, respectively.

In another example, assuming that the calling user defines a sequential ringing number group including five phone numbers A, B, C, D and E, then it can be determined that there are five phone number groups to be dialed in the sequential ringing mode, wherein each of the phone number groups includes one of the numbers A, B, C, D and E, respectively.

Of course, each of the phone number groups is not necessary to include only one phone number, but may include a plurality of phone numbers to be dialed in the simultaneous ringing mode. For example, assuming that the calling user defines a sequential ringing number group including five phone numbers A, B, C, D and E in which phone number D is a group number for a simultaneous ringing number group including three phone numbers D1, D2 and D3. In this case, it can be determined that there are five phone number groups to be dialed in the sequential ringing mode, in which the first, second, third and fifth phone number groups each includes one number of A, B, C and E, respectively, and the fourth phone number group includes three phone numbers to be rung simultaneously.

At step S302, the plurality of phone number groups and a dialing flag are transmitted to a calling server, the dialing flag including a simultaneous or sequential ringing flag indicating that the plurality of phone number groups are dialed in the simultaneous or sequential ringing mode.

The simultaneous or sequential ringing flag can be any flag set in advance. For example, "12580*" can be used to indicate the sequential ringing and "12580|" can be used to indicate the simultaneous ringing. In this way, when the simultaneous or sequential ringing flag is set to "12580*", it indicates that the plurality of phone number groups should be dialed in the sequential ringing mode, and when the simultaneous or sequential dialing flag is set to "12580|", it indicates that the plurality of phone number groups should be dialed in the simultaneous ringing mode.

In this step, the plurality of phone number groups and the dialing flag can be transmitted to the calling server in any form, such as XML text, character string or the like. Taking the character string as an example, assuming the calling user desires to dial the five phone numbers A, B, C, D and E in the simultaneous ringing mode, then in this step, the character string such as "12580|A B C D E" can be transmitted to the calling server. Of course, this character string is only an example and other character strings such as "12580|A 12580|B 12580|C 12580|D 12580|E" can also be formed and transmitted to the calling server.

Alternatively, the dialing flag can also include a start flag to request the calling server to start the simultaneous and/or sequential ringing mode. The start flag can be any flag set in advance. For example, "12580" can be used to indicate this start flag. For example, assuming that the calling party desires to dial the five phone numbers A, B, C, D and E in the sequential ringing mode and the number D is a group number for a simultaneous ringing number group including three phone numbers D1, D2 and D3, if the sequential ringing and the simultaneous ringing are simply represented by "*" and "|", then in this step, the character string such as "12580*A*B*C*D1|D2|D3*E" can be transmitted to the calling server.

The dialing method applied to the calling party according to an embodiment of the present disclosure has been described above with reference to FIG. 3. In this method, the calling party can freely custom multiple phone numbers desired to be rung simultaneously or sequentially and transmit them to the calling server. Since the multiple phone numbers to be rung simultaneously or sequentially need not to be registered in the calling server in advance, the trouble of the user registering the numbers in the calling server may be canceled and the calling server does not need to maintain the large-scale database for storing the multiple numbers at a large cost.

After the plurality of phone number groups desired to be dialed in the simultaneous or sequential ringing mode and the dialing flag are transmitted to the calling server by the calling party, the calling server will perform a corresponding dialing. One example of a flow chart of the dialing method applied to the calling server according to an embodiment of the present disclosure will be described below with reference to FIG. 4.

Figure 4:
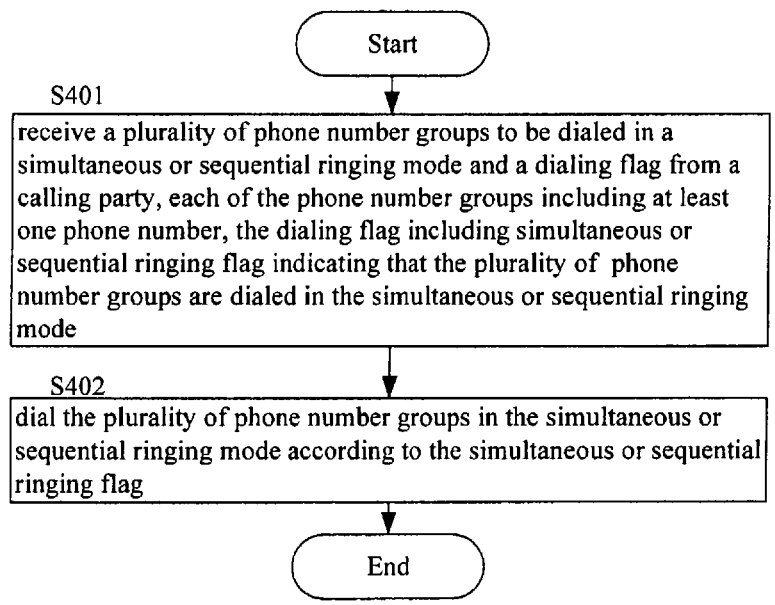
FIG. 4 illustrates a flow chart of a dialing method which is applied to the calling server according to an embodiment of the present disclosure.

As shown in FIG. 4, at step S401, a plurality of phone number groups to be dialed in a simultaneous or sequential ringing mode and a dialing flag are received from a calling party, wherein each of the phone number groups includes at least one phone number, and the dialing flag includes a simultaneous or sequential ringing flag indicating that the plurality of phone number groups are dialed in the simultaneous or sequential ringing mode.

As described above, the simultaneous or sequential ringing flag can be any flag set in advance. For example, "12580*" can be used to indicate the sequential ringing and "12580|" can be used to indicate the simultaneous ringing. In this way, when the simultaneous or sequential ringing flag received is "12580*", it indicates that the plurality of phone number groups should be dialed in the sequential ringing mode, and when the simultaneous or sequential dialing flag received is "12580|", it indicates that the plurality of phone number groups should be dialed in the simultaneous ringing mode.

As described above, the calling party can transmit the plurality of phone number groups and the dialing flag to the calling server in any suitable form. Thereby the plurality of phone number groups and the dialing flag in any form, such as XML text, character string or the like, can be received in this step. Hereinafter, for the ease of description, an example in which the plurality of phone number groups to be dialed in the simultaneous or sequential ringing mode and the dialing flag received from the calling party are included in a character string is described.

At step S402, the plurality of phone number groups are dialed in the simultaneous or sequential ringing mode according to the simultaneous or sequential ringing flag.

In this step, the calling server determines whether the plurality of phone number groups should be dialed in the simultaneous or sequential ringing mode according to the simultaneous or sequential ringing flag included in the character string. For example, assuming the received character string is "12580|A B C D E", since "12580|" is set in advance to indicate the simultaneous ringing, the calling server dials in the simultaneous ringing mode; that is, dials the five phone numbers A, B, C, D and E simultaneously.

Alternatively, as described above, the dialing flag can also include a start flag which is set in advance to request the calling server to start the simultaneous or sequential ringing mode. Accordingly, the received character string may include the start flag, the simultaneous or sequential ringing flag and the plurality of phone number groups. For example, it is assumed the received character string is "12580*A*B*C*D1|D2|D3*E", "12580" is set in advance to indicate the start flag and the sequential and simultaneous ringing are represented by "*" and "|", respectively. The calling server will dial the five phone number A, B, C, D and E in the sequential ringing mode, and will dial the three phone numbers D1, D2 and D3 included in group D in the simultaneous ringing mode when dialing the group number D.

It is to be noted that in the case that the plurality of phone number groups are dialed in the sequential ringing mode, a general manner of dialing is that the calling sever dials the plurality of phone number groups sequentially and when at least one phone number of a certain phone number group answers, the subsequent phone number groups will not be dialed any more. As an optional manner, the calling server can dial the plurality of phone number groups sequentially until each of the plurality of phone number groups is traversed. In specific, when the phone number group currently being dialed does not answer in a predetermined time, the calling server dials a next phone number group in the predetermined order, and when at least one phone number of the phone number group currently being dialed answers, instead of terminating the dialing procedure, the calling server will continue to dial the next phone number group upon ending of the current answer, until each group is traversed.

A flow chart of the dialing method applied to the calling server according to an embodiment of the present disclosure has been described above with reference to FIG. 4. In this method, the plurality of phone numbers to be rung simultaneously or sequentially are received from the calling party without registering these numbers in the calling server in advance, so that the calling server does not need to maintain the large-scale database for storing the multiple phone numbers at a large cost.

Figure 5:
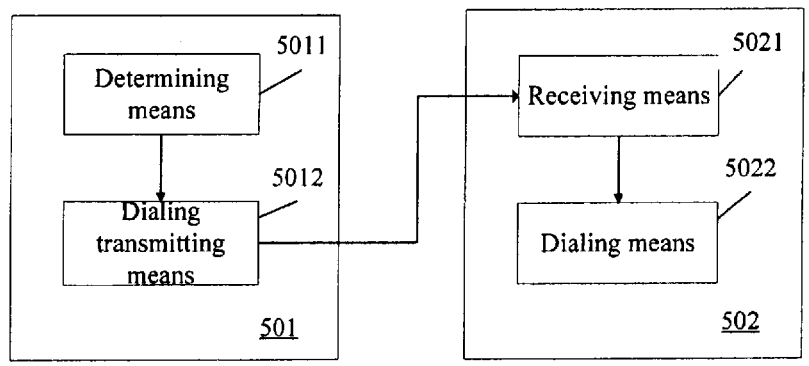
FIG. 5 illustrates a schematic diagram of a dialing system according to an embodiment of the present disclosure.

A schematic diagram of the dialing system according to an embodiment of the present disclosure will be described below with reference to FIG. 5.

A dialing system 500 according to the embodiment of the present disclosure can perform the dialing methods as described in the above embodiment. As shown in FIG. 5, the dialing system 500 includes a calling party dialing means 501 positioned at the calling party and a server dialing means 502 positioned at the calling server. The calling party dialing means 501 includes a determining means 5011 and a dialing transmitting means 5012, and the server dialing means 502 includes a dialing receiving means 5021 and a dialing means 5022.

The determining means 5011 is configured to determine a plurality of phone number groups to be dialed in a simultaneous or sequential ringing mode, each of the groups includes at least one phone number. In specific, the determining means 5011 can determine the plurality of phone number groups to be dialed in a simultaneous or sequential ringing mode based on groups of simultaneous ringing numbers and/or groups of sequential ringing numbers defined by a user of the calling party.

For example, assuming that the user of the calling party defines a simultaneous/sequential ringing number group including five phone numbers A, B, C, D and E, then the determining means 5011 can determine that there are five phone number groups to be dialed in the simultaneous/sequential ringing mode, and each phone number group includes one of the numbers A, B, C, D and E, respectively.

Of course, each of the number groups is not necessary to include only one phone number, but may include a plurality of phone numbers to be dialed in the simultaneous ringing mode. For example, assuming that the calling user defines a sequential ringing number group including five phone numbers A, B, C, D and E in which phone number D is a group number for a simultaneous ringing number group including three phone numbers D1, D2 and D3. In this case, the determining means 5011 can determine that there are five phone number groups to be dialed in the sequential ringing mode, in which the first, second, third and fifth groups each includes one number of A, B, C and E, respectively, and the fourth phone number group includes three phone numbers to be rung simultaneously.

The dialing transmitting means 5012 is configured to transmit the phone number groups and a dialing flag to the calling server, the dialing flag includes a simultaneous or sequential dialing flag indicating that the plurality of phone number groups are dialed in the simultaneous or sequential ringing mode.

As described above, the simultaneous or sequential ringing flag can be any flag set in advance. When the simultaneous or sequential ringing flag is set to the flag indicating the sequential ringing, the plurality of phone number groups should be dialed in the sequential ringing mode, and when the simultaneous or sequential dialing flag is set to the flag indicating the simultaneous ringing, the plurality of phone number groups should be dialed in the simultaneous ringing mode.

The plurality of phone number groups and the dialing flag can be transmitted to the calling server in any form, such as XML text, character string or the like. In addition, as an option, the dialing flag can also include a start flag to request the calling server to start the simultaneous and/or sequential ringing mode and the start flag can be any flag set in advance.

For example, in the case that the calling party desires to dial the five phone numbers A, B, C, D and E in the sequential ringing mode and the number D is a group number for a simultaneous ringing number group including three phone numbers D1, D2 and D3, if the start flag is represented by "12580", the sequential ringing and simultaneous ringing are represented by "*" and "|", respectively, and the phone number groups and the dialing flag are transmitted in the form of character string, then the generating means in the dialing transmitting means 5012 can generate a character string consisted of the dialing flag and the phone number groups, such as "12580*A*B*C*D1|D2|D3*E", and the transmitting means in the dialing transmitting means 5012 can transmit this character string to the calling server.

The dialing receiving means 5021 is configured to receive the plurality of phone number groups to be dialed in the simultaneous or sequential ringing mode and the dialing flag from the calling party, in which each of the phone number groups includes at least one phone number, and the dialing flag includes a simultaneous or sequential ringing flag indicating that the plurality phone number groups are dialed in the simultaneous or sequential ringing mode.

As described above, the dialing transmitting means 5012 can transmit the plurality of phone number groups and the dialing flag to the calling server in any suitable form. Thereby the dialing receiving means 5021 can receive the plurality of phone number groups and the dialing flag in any form, such as XML text, character string or the like. Hereinafter, for the ease of description, an example in which the plurality of phone number groups to be dialed in the simultaneous or sequential ringing mode and the dialing flag received from the calling party are included in a character string is described.

The dialing means 5022 is configured to dial the plurality of phone number groups in the simultaneous or sequential ringing mode according to the simultaneous or sequential ringing flag.

In specific, the dialing means 5022 determines whether the plurality of phone number groups should be dialed in the simultaneous or sequential ringing mode according to the simultaneous or sequential dialing flag included in the character string. For example, assuming the received character string is "12580|A B C D E", and "12580|" is set in advance to indicate the simultaneous ringing, then the dialing means 5022 dials in the simultaneous ringing mode; that is, dials the five phone numbers A, B, C, D and E simultaneously.

As an option, as described above, the dialing flag can also include a start flag which is set in advance to request the calling server to start the simultaneous or sequential ringing mode. Accordingly, the character string received by the dialing receiving means 5021 may include the start flag, the simultaneous or sequential ringing flag and the plurality of phone number groups. For example, it is assumed the received character string is "12580*A*B*C*D1|D2|D3*E", wherein the start flag is represented by "12580" and the sequential and simultaneous ringing are represented by "*" and "|", respectively, then the dialing means 5022 will dial the five phone number A, B, C, D and E in the sequential ringing mode, and will dial the three phone numbers D1, D2 and D3 included in group D in the simultaneous ringing mode when dialing the group number D.

It is to be noted that in the case that the plurality of phone number groups are dialed in the sequential ringing mode, a general manner of dialing is that the dialing means 5022 dials the plurality of phone number groups sequentially and when at least one phone number of certain phone number groups answers, the sequent phone number groups will not be dialed any more. As an optional manner, the dialing means 5022 can dial the plurality of phone number groups sequentially until each of the plurality of phone number groups is traversed. In specific, when the phone number group currently being dialed does not answer in a predetermined time, the dialing means 5022 dials the next phone number group in the predetermined order, and when at least one phone number of the phone number group currently being dialed answers, instead of terminating the dialing procedure, the dialing means 5022 will continue to dial the next phone number group when the current answer ends, until each groups is traversed.

A dialing system according to an embodiment of the present disclosure has been described above with reference to FIG. 5. In the dialing system, the calling party can freely custom multiple phone numbers to be dialed simultaneously or sequentially and notify the calling server. The calling server dials the multiple phone numbers received from the calling party in the simultaneous or sequential ringing mode according to the request from the calling party, therefore, the multiple phone numbers to be rung simultaneously or sequentially do not need to be registered in the calling server in advance, the trouble of the user registering the numbers in the calling server may be avoided, and a large cost is not required for the calling server to maintain the large-scale database for storing the multiple numbers.

As described herein, according to an aspect of the present disclosure, there is provided a dialing method for a calling party, comprising: determining a plurality of phone number groups to be dialed in a simultaneous or sequential ringing mode, each of the groups including at least one phone number; and transmitting the plurality of phone number groups and a dialing flag to a calling server, the dialing flag including a simultaneous or sequential ringing flag indicating that the plurality of phone number groups are dialed in the simultaneous or sequential ringing mode.

According to another aspect of the present disclosure, there is provided a dialing method for a calling server, comprising: receiving a plurality of phone number groups to be dialed in a simultaneous or sequential ringing mode and a dialing flag from a calling party, each of the groups including at least one phone number, the dialing flag including a simultaneous or sequential ringing flag indicating that the plurality of phone number groups are dialed in the simultaneous or sequential ringing mode; and dialing the plurality of phone number groups in the simultaneous or sequential ringing mode according to the simultaneous or sequential ringing flag.

According to another aspect of the present disclosure, there is provided a dialing method comprising the steps of the dialing method for the calling party and the dialing method for the calling server as described above.

According to another aspect of the present disclosure, there is provided a dialing device for a calling party comprising: a determining means, configured to determine a plurality of phone number groups to be dialed in a simultaneous or sequential ringing mode, each of the groups including at least one phone number; and a dialing transmitting means, configured to transmit the plurality of phone number groups and a dialing flag to a calling server, the dialing flag including a simultaneous or sequential ringing flag indicating that the plurality of phone number groups are dialed in the simultaneous or sequential ringing mode.

According to another aspect of the present disclosure, there is provided a dialing device for a calling server comprising: a dialing receiving means, configured to receive a plurality of phone number groups to be dialed in a simultaneous or sequential ringing mode and a dialing flag from a calling party, each of the groups including at least one phone number and the dialing flag including a simultaneous or sequential dialing flag indicating that the phone number groups are dialed in the simultaneous or sequential ringing mode; and a dialing means, configured to dial the plurality of phone number groups in the simultaneous or sequential ringing mode according to the simultaneous or sequential dialing flag.

According to another aspect of the present disclosure, there is provided a dialing system comprising the dialing device for the calling party and the dialing device for the calling server as described above.

According to the methods, devices and system of the aspects of the present disclosure as described above, the calling party can freely custom multiple phone numbers desired to be rung simultaneously or sequentially and notify the calling server. The calling server dials the multiple phone numbers received from the calling party in the simultaneous or sequential ringing mode according to the request from the calling party. Therefore, the multiple phone numbers desired to be dialed in a simultaneous/sequential ringing mode do not need to be registered in the calling server in advance, thereby the trouble of the user registering the numbers in the calling server may be avoided and the calling server does not need to maintain the large-scale database for storing the multiple numbers at a large cost.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A dialing method, comprising:
   receiving, by a calling server from a calling party device, a plurality of phone number groups to be dialed in at least one of a simultaneous ringing mode, a sequential ringing mode, or a combined simultaneous-sequential ringing mode, the calling device being separate than the calling server, each phone number group of the plurality of phone number groups including a respective at least one phone number and the receiving including receiving the respective at least one phone number of each phone number group of the plurality of phone number groups, and further receiving, from the calling party device, a dialing flag string for selectively initiating dialing of the respective at least one phone number of each phone number group of the plurality of phone number groups based on the dialing flag string, the dialing flag string including at least one of a simultaneous ringing flag, a sequential ringing flag, or a combined simultaneous-sequential ringing flag, indicating that the plurality of phone number groups are to be dialed in at least one of the simultaneous ringing mode, the sequential ringing mode, or the combined simultaneous-sequential ringing mode; wherein at least one phone number of a phone number group of the plurality of phone number groups is not previously registered in the calling server; and
   initiating dialing the plurality of phone number groups in at least one of the simultaneous ringing mode, the sequential ringing mode, or the combined simultaneous-sequential ringing mode according to the at least one of the simultaneous ringing flag, the sequential ringing flag, or the combined simultaneous-sequential ringing flag.

2. The dialing method according to claim 1, wherein based on a phone number group of the plurality of phone number groups comprising a plurality of phone numbers, the initiating the dialing comprises initiating dialing of the plurality of phone numbers in the simultaneous ringing mode.

3. The dialing method according to claim 1, further comprising determining the plurality of phone number groups to be dialed in the at least one of the simultaneous ringing mode, the sequential ringing mode, or the combined simultaneous-sequential ringing mode based on at least one of groups of simultaneous ringing numbers or groups of sequential ringing numbers defined by a user of a calling party.

4. The dialing method according to claim 1, wherein said dialing flag string further comprises a start flag for the calling server to start the at least one of the simultaneous ringing mode, the sequential ringing mode, or the combined simultaneous-sequential ringing mode.

5. The dialing method according to claim 1, wherein the receiving the plurality of phone number groups and the dialing flag string comprises receiving a generated character string that includes the dialing flag string and the plurality of phone number groups including the respective at least one phone number of each phone number group of the plurality of phone number groups.

6. The dialing method according to claim 1, wherein in the case that the plurality of phone number groups are to be dialed in the sequential ringing mode, the initiating initiates the sequential dialing of the plurality of phone number groups until each of the groups is traversed.

7. The dialing method according to claim 6, wherein the sequential dialing of the plurality of phone number groups comprises, in response to a phone number group currently being dialed not answering in a predetermined time, dialing a next phone number group.

8. The dialing method according to claim 6, wherein the sequential dialing of the plurality of phone number groups comprises, in response to at least one phone number of the phone number group currently being dialed answering, continuing to dial the next phone number group upon ending of the answering.

9. A computer system, comprising:
a memory; and
a processing device in communication with the memory, wherein the computer system is configured to:
receive, by a calling server from a calling party device, a plurality of phone number groups to be dialed in at least one of a simultaneous ringing mode, a sequential ringing mode, or a combined simultaneous-sequential ringing mode, the calling device being separate than the calling server, each phone number group of the plurality of phone number groups including a respective at least one phone number and the receiving including receiving the respective at least one phone number of each phone number group of the plurality of phone number groups, and further receive, from the calling party device, a dialing flag string for selectively initiating dialing of the respective at least one phone number of each phone number group of the plurality of phone number groups based on the dialing flag string, the dialing flag string including at least one of a simultaneous ringing flag, a sequential ringing flag, or a combined simultaneous-sequential ringing flag, indicating that the plurality of phone number groups are to be dialed in at least one of the simultaneous ringing mode, the sequential ringing mode, or the combined simultaneous-sequential ringing mode; wherein at least one phone number of a phone number group of the plurality of phone number groups is not previously registered in the calling server; and
initiate dialing the plurality of phone number groups in at least one of the simultaneous ringing mode, the sequential ringing mode, or the combined simultaneous-sequential ringing mode according to the at least one of the simultaneous ringing flag, the sequential ringing flag, or the combined simultaneous-sequential ringing flag.

10. The computer system according to claim 9, wherein said dialing flag string further comprises a start flag for the calling server to start the at least one of the simultaneous ringing mode, the sequential ringing mode, or the combined simultaneous-sequential ringing mode.

11. The computer system according to claim 9, wherein the receiving the plurality of phone number groups and the dialing flag string comprises receiving a generated character string that includes the dialing flag string and the plurality of phone number groups including the respective at least one phone number of each phone number group of the plurality of phone number groups.

12. The computer system according to claim 9, wherein in the case that the plurality of phone number groups are to be dialed in the sequential ringing mode, the initiating initiates sequential dialing of the plurality of phone number groups until each of the groups is traversed.

13. The computer system according to claim 12, wherein the sequential dialing of the plurality of phone number groups comprises, in response to a phone number group currently being dialed not answering in a predetermined time, dialing a next phone number group.

14. The computer system according to claim 12, wherein the sequential dialing of the plurality of phone number groups comprises, in response to at least one phone number of the phone number group currently being dialed answering, continuing to dial the next phone number group upon ending of the answering.

15. The computer system according to claim 9, wherein based on a phone number group of the plurality of phone number groups comprising a plurality of phone numbers, the initiating the dialing comprises initiating dialing of the plurality of phone numbers in the simultaneous ringing mode.

16. A computer program product, comprising:
a non-transitory computer readable storage medium readable by a processing circuit and storing instructions for execution by the processing circuit for performing a method comprising:
receiving, by a calling server from a calling party device, a plurality of phone number groups to be dialed in at least one of a simultaneous ringing mode, a sequential ringing mode, or a combined simultaneous-sequential ringing mode, the calling device being separate than the calling server, each phone number group of the plurality of phone number groups including a respective at least one phone number and the receiving including receiving the respective at least one phone number of each phone number group of the plurality of phone number groups, and further receiving, from the calling party device, a dialing flag string for selectively initiating dialing of the respective at least one phone number of each phone number group of the plurality of phone number groups based on the dialing flag string, the dialing flag string including at least one of a simultaneous ringing flag, a sequential ringing flag, or a combined simultaneous-sequential ringing flag, indicating that the plurality of phone number groups are to be dialed in at least one of the simultaneous ringing mode, the sequential ringing mode, or the combined simultaneous-sequential ringing mode; wherein at least one phone number of a phone number group of the plurality of phone number groups is not previously registered in the calling server; and initiating dialing the plurality of phone number groups in at least one of the simultaneous ringing mode, the sequential ringing mode, or the combined simultaneous-sequential ringing mode according to the at least one of the simultaneous ringing flag, the sequential ringing flag, or the combined simultaneous-sequential ringing flag.

17. The computer program product according to claim 16, wherein said dialing flag string further comprises a start flag for the calling server to start the at least one of the simultaneous ringing mode, the sequential ringing mode, or the combined simultaneous-sequential ringing mode.

18. The computer program product according to claim 16, wherein the receiving the plurality of phone number groups and the dialing flag string comprises receiving a generated character string that includes the dialing flag string and the plurality of phone number groups including the respective at least one phone number of each phone number group of the plurality of phone number groups.

19. The computer program product according to claim 16, wherein in the case that the plurality of phone number groups are to be dialed in the sequential ringing mode, the initiating initiates sequential dialing of the plurality of phone number groups until each of the groups is traversed.

20. The computer program product according to claim 16, wherein based on a phone number group of the plurality of phone number groups comprising a plurality of phone numbers, the initiating the dialing comprises initiating dialing of the plurality of phone numbers in the simultaneous ringing mode.

\* \* \* \* \*